June 10, 1930.   G. A. SCHETTLER   1,762,355
LEATHER MEASURING AND MARKING MACHINE
Filed Sept. 22, 1926   4 Sheets-Sheet 1
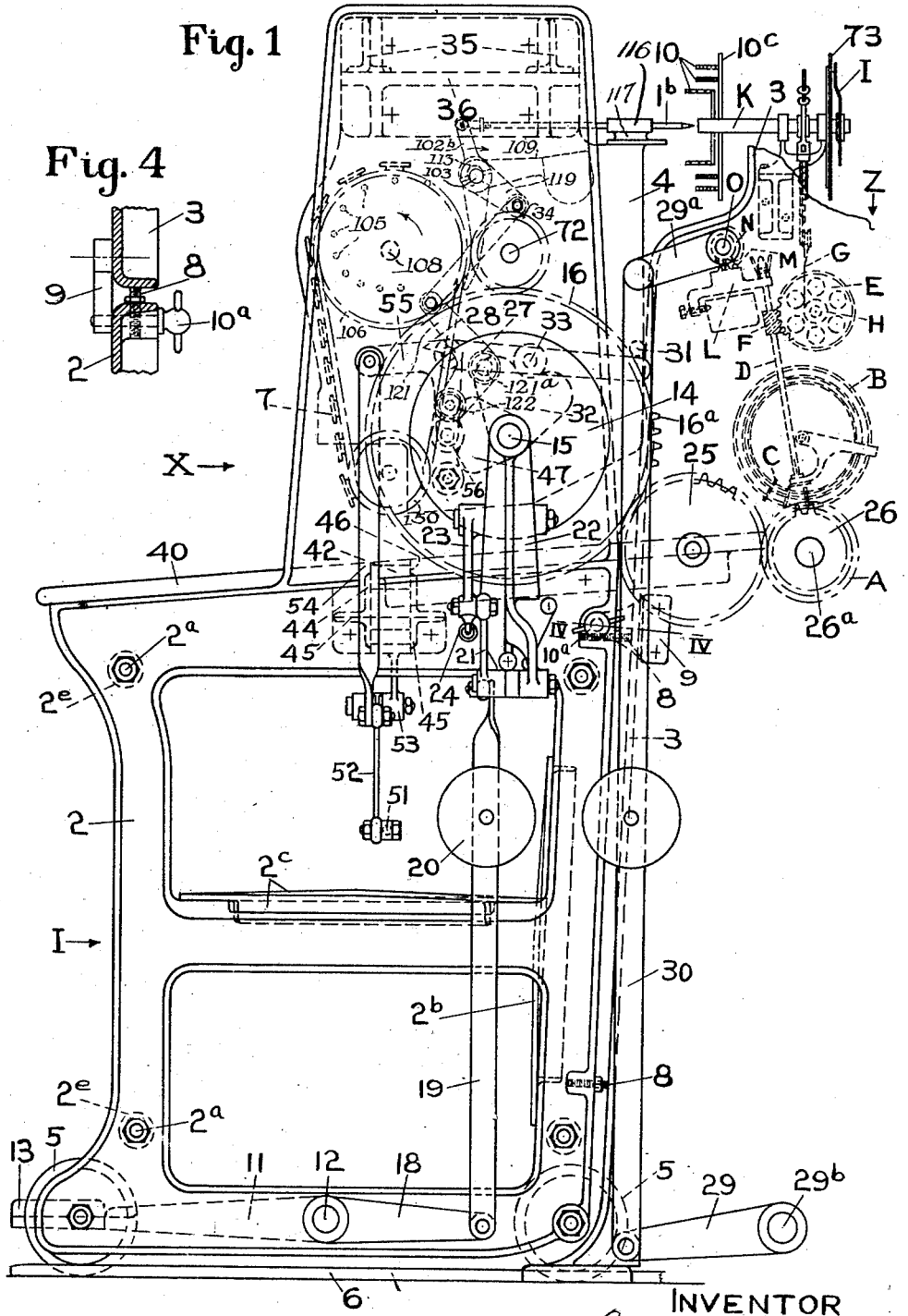
INVENTOR

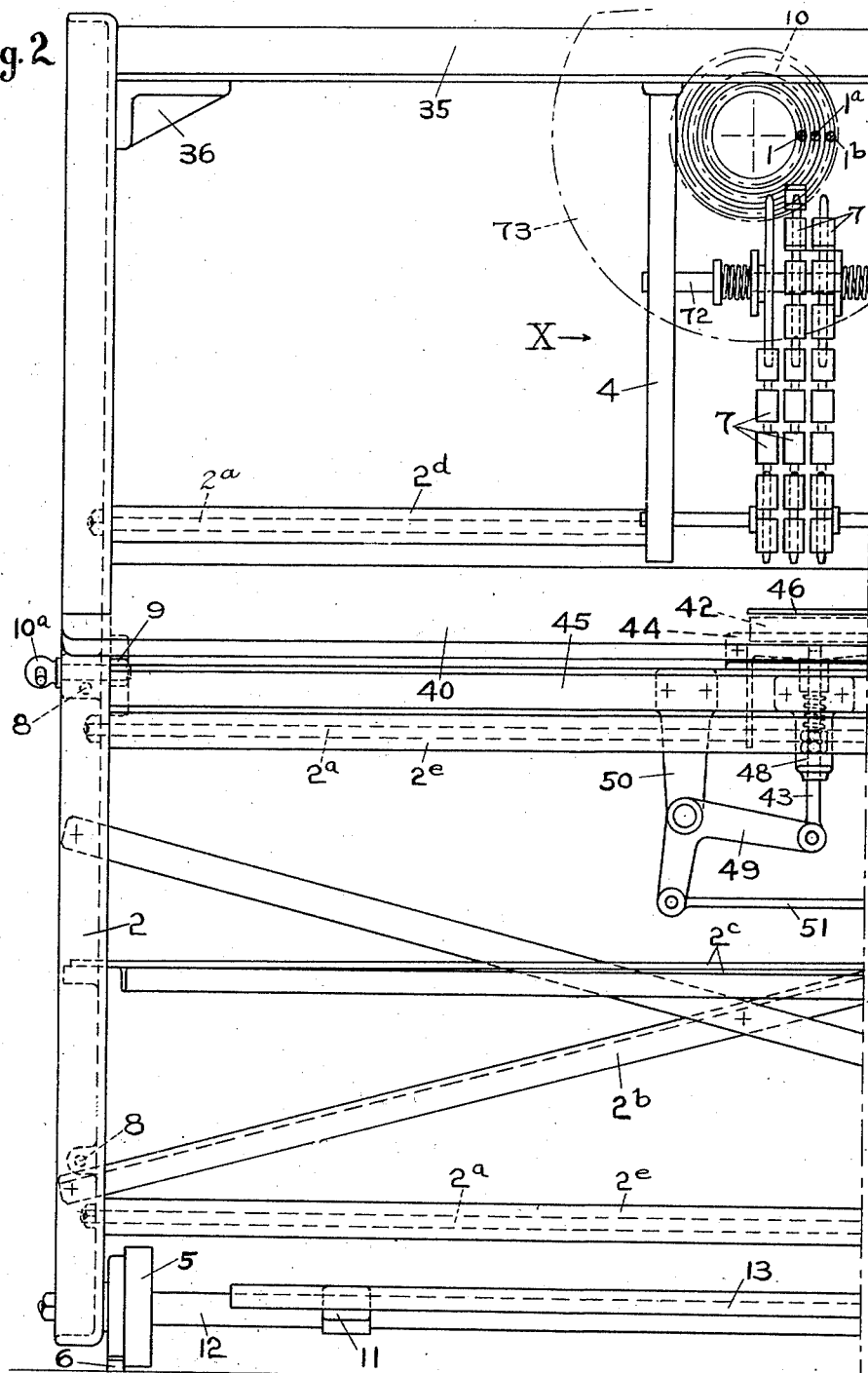

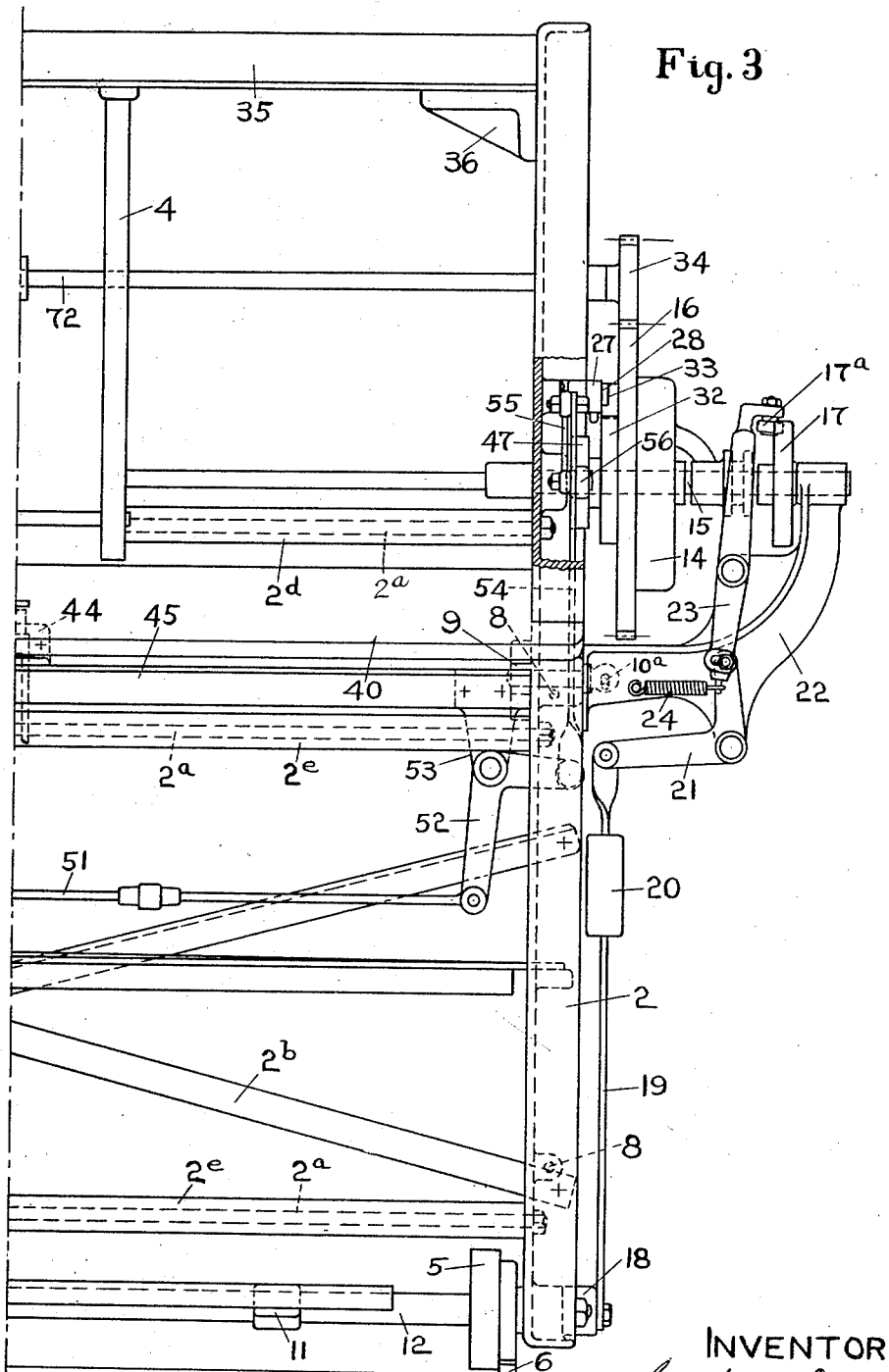

June 10, 1930. G. A. SCHETTLER 1,762,355
LEATHER MEASURING AND MARKING MACHINE
Filed Sept. 22, 1926 4 Sheets-Sheet 4
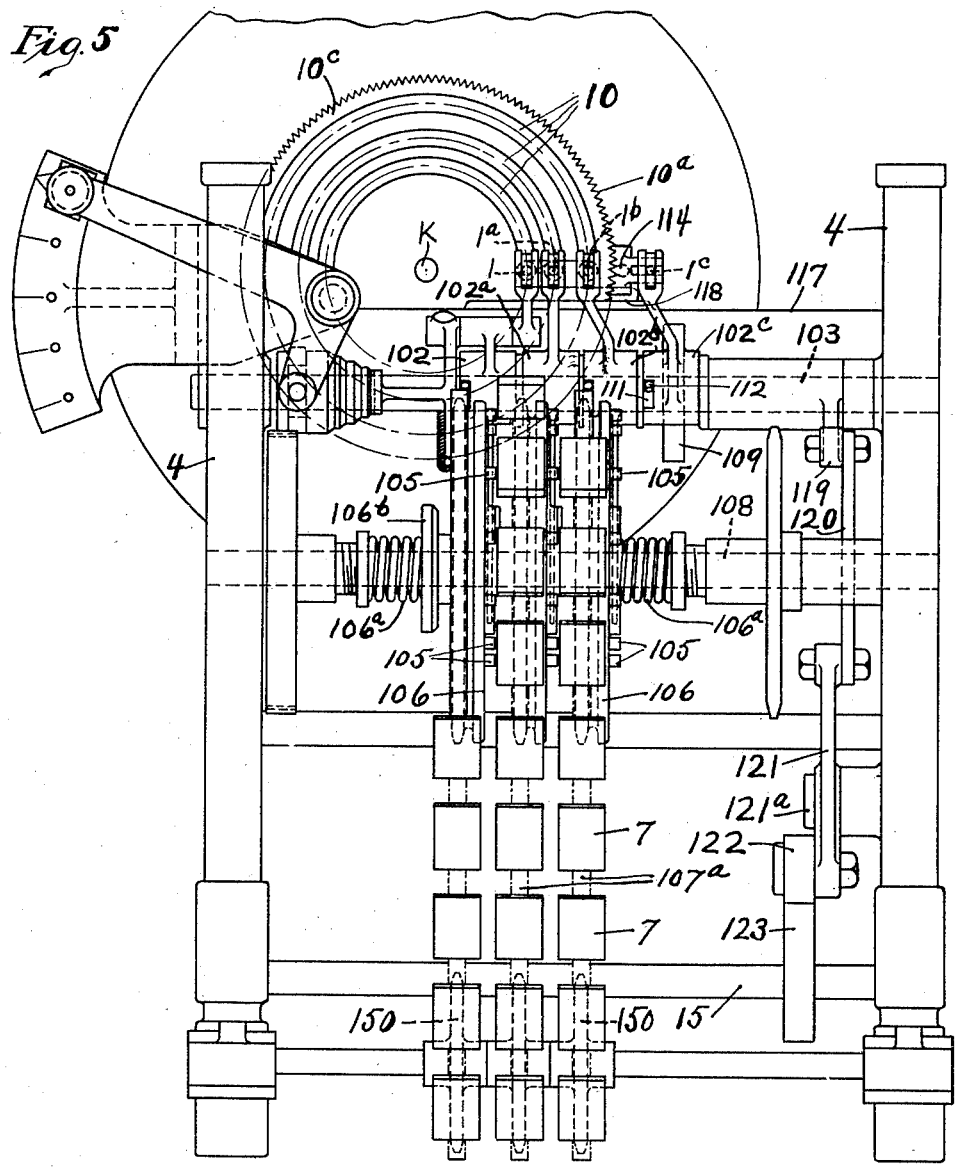
Inventor
Gustav A. Schettler
By his Attorney
Nelson M. Howard Patented June 10, 1930

1,762,355

UNITED STATES PATENT OFFICE

GUSTAV ADOLF SCHETTLER, OF LEEDS, ENGLAND, ASSIGNOR TO THE TURNER TANNING MACHINERY COMPANY, OF PORTLAND, MAINE, A CORPORATION OF MAINE

LEATHER MEASURING AND MARKING MACHINE

Application filed September 22, 1926, Serial No. 137,136, and in Great Britain September 29, 1925.

This invention relates to machines for measuring pieces of leather and marking characters on the pieces of leather to record certain characteristics such as their thickness or length dimensions.

As heretofore constructed leather measuring and marking mechanisms have been built to be operated invariably as a unit, the measuring and marking means operating to perform their functions as integral parts of an organized measuring and marking machine. The combined measuring and marking machine while usually efficient for the purposes intended does not always meet the exacting requirements of the industry since there are at times distinct advantages in operating the measuring means as a separate unit for certain measuring operations upon leather and other similar classes of work. On the other hand, the employment of independent measuring and marking machines, as an outfit for measuring pieces of leather and marking the measurements on each piece, requires a double handling of the work involving greatly increased costs due to the time and labor consumed.

It is an object of the invention to provide an improved measuring and marking machine capable of operating as a unit upon successive pieces of work, which may be readily separated into independent measuring and marking units of which the former may be employed for measuring operations only while the latter may be readily attached successively to any number of measuring machines in such a way as to be operated in timed relation with each measuring machine thereby adding very considerably to the efficiency of both the marking and measuring mechanisms as compared with that of individually operated marking and measuring machines and at the same time economizing in the number of marking mechanisms necessary for a given output of work.

To these ends, and in accordance with important features of the invention, there is provided a movable support for a marking mechanism together with a stop for limiting approaching movement of the marking mechanism with respect to a measuring mechanism to protect gear; means for detachably connecting driving means for the marking mechanism with driving means for a measuring mechanism. In the illustrated organization, movement of the support is controlled by guides or aligning means to carry the marking mechanism along a predetermined path toward the measuring mechanism to cause the two driving means to become operatively interconnected, thereby providing a simple construction for driving the mechanisms of the combined machine in timed relation. As illustrated, a controlling wheel in the marking mechanism is provided with driving connections for meshing directly with a gear on the power shaft of the measuring mechanism upon movement of the support, whereby the marking mechanism is driven from the measuring mechanism.

Another feature of importance relates to the provision, in an organization in which the marking mechanism is controlled by the operator independently of the measuring mechanism, of means by which at the termination of a marking operation certain elements of the measuring mechanism are automatically restored to initial position, thus promptly conditioning the measuring mechanism for operation upon a succeeding piece of work. This is a distinct advantage since without this arrangement the said elements would have to be returned to initial position through a chain of operating parts controlled directly by the operator, who is freed from the necessity of attending to this operation when operating the improved construction. As illustrated, this means comprises connections between a controlling cam on the marking mechanism and a trip member for certain indicating and measuring elements of the measuring mechanism whereby the measuring elements are returned to initial position for a succeeding operation and the indicating elements to zero position for proper operation by the measuring elements in a succeeding measuring operation. Conveniently, and as shown, the said connections comprise an abutment on the trip member of the measuring mechanism whereby the latter is operated by the controlling cam of the marking mechanism in such timed relation that the restoration of the measuring and indicating elements to initial position automatically follows closely after the termination of the marking operation.

These and other features of the invention will now be described in detail and pointed out in the appended claims.

In the drawing,

Figure 1 is an end elevation of a marking mechanism and of a measuring mechanism organized according to the present invention;

Figs. 2 and 3 together constitute a front elevation of the mechanism shown in Fig. 1 as viewed from where the operator stands;

Fig. 4 is a section taken on the line IV—IV of Fig. 1.

Fig. 5 is a detail view of the marking mechanism.

In the preferred embodiment of the invention illustrated in the drawings, marking mechanism indicated generally by X is mounted on a support consisting of a carriage 1 comprising end frames 2 connected by tie members 2$^a$, 2$^b$ and 2$^c$, each end frame 2 being provided with flanged wheels 5 to run on rails 6 extending rearwards from the back of a measuring mechanism, indicated generally by Z, one end frame 3 of which is represented in Fig. 1. The rails constitute means for aligning the marking and measuring mechanisms during their relative approaching movement. A portion of said frame 3 is also shown in Fig. 4. The carriage 1 is movable along said rails 6, i. e., towards the measuring mechanism by hand, i. e., simply by pushing or pulling, to connect the marking mechanism detachably to the measuring mechanism, and in the reverse direction to cause disconnection from the measuring mechanism.

Upon reference to Fig. 1 of the drawings it will be observed that the area measuring mechanism, with which the marking or stamping mechanism is designed to be detachably connected, comprises a bed roll A which is power operated to feed hides, skins or other leather pieces beneath a plurality of measuring wheels, one of which is shown at B provided with pins C. While only three pins are shown, it is to be understood that each wheel B is provided throughout its periphery with equally spaced pins C which are movable by a piece of work passing over the bed roll A into position to rotate the shaft D. Rotation of the shaft D causes rotation of a worm wheel E through a worm F secured to the shaft D and arranged to mesh with the teeth of the worm wheel E. Upon rotation of the worm wheel E, a flexible member G is caused to wind upon the hub H of the worm wheel E, the arrangement being such that the amount of winding of the flexible element G controls correspondingly movements of a totalizing mechanism, not shown, connections from which serve to operate a pointer I of a well-known type of recording mechanism, the dial of which is indicated at 73 in Fig. 2. In order that both the pointer I on shaft K and the worm wheels E of the measuring and totalizing mechanism may be returned to initial position after the completion of a measuring operation on one piece of work, provision is made for moving the worm F away from the worm wheel E which is thus permitted to return to initial position, this operation also restoring the pointer to its initial position on the dial. In order that the worm F may be moved away from the worm wheel E, the upper end of the shaft D (and of all the similar shafts D) is mounted in a bar L supported at its ends in the end frames 3 for swinging movement toward and from the worm wheel E. For causing this movement of the bar L there is provided at each of its ends a short rack M in mesh with which is a pinion N on a shaft O adapted to be rocked by a lever arm 29$^a$ on the shaft, as will be hereinafter described. Upon upward movement of the lever arm 29$^a$, the bar L will be caused to swing away from the worm wheel E, thereby removing the worm F from contact with the worm wheel E, permitting this wheel and all its fellows to return to initial position, through the action of a weighted member (not shown) which tends constantly to return the measuring elements to their initial positions of rest. Movement of the bar L to its initial position will cause meshing of the worm F with the worm wheel E, thus restoring the parts to operative driving condition. For a more complete disclosure of the described area measuring mechanism, reference should be had to United States Letters Patent No. 1,046,655, granted December 10, 1912, upon application of G. A. Schettler.

The position of the carriage 1 in relation to the measuring mechanism Z may be determined by adjustable set screws 8 (Figs. 1 and 4) tapped into the end frames 2 and adapted to abut against the corresponding end frames 3 of the measuring mechanism. The carriage 1 may be locked in position for use by means of suitable pins, bolts or other devices inserted into aligned holes in adjacent parts of the carriage and the measuring mechanism or in lugs attached thereto. Conveniently plates 9 formed with lugs having holes therethrough are attached to the end frames 3 of the measuring mechanism Z so as to project therefrom and are engaged by pins or bolts 10$^a$ passed through corresponding holes in the end frames 2 for locating and locking the carriage 1 in operative position. The pins or bolts may have a slight taper fitting into the holes. These pins and bolts together with the rails 6 provide means for securing exact alignment of the marking and measuring mechanisms and particularly of the operating or driving means presently to be described.

For putting the stamping or marking mechanism X in operation, there is provided a treadle comprising arms 11 fast on a shaft 12 and connected by a bar 13 which serves as the tread portion of the treadle, said shaft being adapted to rock in the end frames 2. This treadle actuates through intermediate connections a clutch 14 (Fig. 3) associated with a shaft 15 having a control wheel 16 loosely mounted thereon by means of which the stamping mechanism X is driven, said clutch having a cam wheel 17 of usual type associated with it so that for each depression of the treadle the control wheel 16 is clutched to the shaft 15 and causes the latter to make a complete revolution and then stop. For this purpose the cam 17 is fixedly attached to the shaft 15 and is provided with a notch into which a roller 17$^a$, secured to a clutch lever 23, drops at the end of each revolution of the shaft 15, the high portion of the cam 17 serving to keep the clutch lever 23 in clutch operating position for one complete revolution of the shaft. As soon as the roller 17$^a$ drops into the notch in cam wheel 17, the lever 23 is moved to clutch releasing position by a spring 24. The treadle actuated connections to operate the clutch 14 conveniently comprise an arm 18 fast on one end of the rock shaft 12, a link 19, fitted with a counterweight 20, connecting said arm 18 with a bell crank lever 21 fulcrumed on a bearing 22 fixed on the end frame 2 adjacent to the control wheel 16. The clutch fork or yoke 23 (Figs. 1 and 3) also fulcrumed upon said bearing 22 is arranged for movement in one direction by the bell crank lever 21 and in the other direction by the spring 24.

The control wheel 16 comprises a toothed gear 16$^a$ (Fig. 1) which, when the carriage 1 is moved up to the measuring mechanism Z, meshes with an appropriate gear wheel 25 rotatably mounted on one end frame 3 of the measuring mechanism and driven by a pinion 26 on main shaft 26$^a$ of said measuring mechanism. That is to say when the carriage 1 is operated to move stamping unit X into operative relation to the measuring unit Z a driving connection between it and the measuring unit is made automatically. The adjustable set screws 8 serve as stop devices to limit the relative approaching movement of the two mechanisms to protect the intermeshing gears 16$^a$, 25.

To enable the measuring and indicating devices of the measuring mechanism to be automatically released and returned to zero when the stamping means are actuated, there is provided a lever 27, Figs. 1 and 3, fulcrumed on a pin 28 in the end frame 2 adjacent to the control wheel 16 so as to project from the carriage support 1 of the marking mechanism and, when the latter is moved up to the measuring machine, to engage means for controlling the measuring and indicating devices. In the illustrated construction, the measuring mechanism Z is equipped with lever arms 29, 29$^a$ (Fig. 1) connected by a counterweighted link 30, the arrangement being such that the lever 27 engages a pin 31 on the link 30 and is operated to lift the latter for restoring the measuring devices to zero. This operation may be accomplished by depressing a treadle (not shown) connected to the shaft 29$^b$ when the measuring mechanism is used separately.

The lever 27 is actuated at the proper time by a cam 32 (Figs. 1 and 3) fixed on the shaft 15, said lever being fitted with a roll 33 for engagement by the cam. Upon operation of the lever 27 by the cam 32, the link 30 is lifted thus moving the lever arm 29$^a$ upwardly. This movement of the arm 29$^a$ causes disconnection of the worms F from the worm wheels E by reason of which the wheels E and the totalizing mechanism operated thereby are all permitted to return to intial position. Hence the lever 27 in co-operation with the link 30 and abutment or pin 31 may be considered to be the means for causing, or for initiating, restoration of the measuring elements to their initial rest positions. Since the pointer is operated from the totalizing mechanism by direct connections it too is permitted to return to initial position, in this case, through the action of gravity on certain parts of the totalizing mechanism as described in detail in Patent No. 1,046,655 already referred to. From the foregoing description it is clear that the operator initiates return of the measuring elements by depressing treadle 13.

The carriage 1 carries a stamping mechanism of the type described in applicant's co-pending application Serial No. 135,009, filed Sept. 13, 1926.

Referring to Figures 1 and 5. the type setting means shown therein comprise slidable plungers 1, 1$^a$ and 1$^b$, and respectively corresponding levers 102, 102$^a$ and 102$^b$ freely mounted on a carrier shaft 103 rotatably supported in end frames 4 in which the main portion of the stamping mechanism (hereinafter described) is mounted. The plungers are jointed by pin-and-slot connections to the levers the depending arms of which latter constitute stops or abutments for engagement selectively by a series of projecting pins 105 disposed in the form of a spiral or volute in the usual manner in corresponding sprocket disks 106, around which type elements 7 on flexible carriers 107$^a$ are passed and which are frictionally and rotatably driven while supported on a shaft 108. The shaft is driven first in the direction of the arrow (Fig. 1) to bring the yieldingly driven disks 106 into set positions as determined by pins 105 in contact with the depending arms of the levers 102, 102$^a$, 102$^b$. Subsequently the shaft 108 is rotated in the opposite direction to return the disks 106 to initial position. Upon reference to Fig. 5 it will be observed that the disks 106 are tightly pressed toward each other, and against washers (one of which is shown at 106$^b$) keyed to the shaft 108, by means of springs 106$^a$. Each disk is thus frictionally driven and may be stopped independently of the others by a lever arm acting on one of the pins 105. For a more complete disclosure of the driving means for the type disks reference may be had to United States Letters Patent No. 1,173,312 granted Feb. 29, 1916, upon application of G. A. Schettler. In the present arrangement each of the levers 102, 102$^a$, 102$^b$ has upon it a weighted arm 109 so that when required it can be turned to bring the free end of its depending arm into position to act on the appropriate pin 105 in the adjacent disk 106. The turning movement of each lever 102, 102$^a$, 102$^b$ is controlled by its associated plunger 1, 1$^a$, 1$^b$, which is operated by the corresponding cam section 10 of a stepped disk 10$^c$ arranged to turn with the indicator pointer I of a measuring machine with which the marking mechanism is associated. For a more complete disclosure of the construction and mode of operation of the cam disk 10$^c$, reference may be had to United States Letters Patent No. 1,114,917, granted Oct. 27, 1914, to G. A. Schettler.

Since the aforesaid levers 102, 102$^a$, 102$^b$ are freely mounted on the shaft 103 for movement to operative position, means are provided for holding said levers and their associated plungers 1, 1$^a$, 1$^b$, in the normal inoperative position, for freeing them for movement to operative position, and for restoring them to initial position. To this end the boss of each lever 102, 102$^a$, 102$^b$ may have circumferential notches or gaps 111 formed in one end of the boss for engagement by a pin 112 fixed radially in the shaft 103 which latter is rotatable in the direction of the arrow (Figure 1) to free the levers so that they can be turned by their weighted arms 109 until arrested by the plungers 1, 1$^a$, 1$^b$, the shaft 103 being rotatable in the reverse direction to restore the levers 102, 102$^a$, 102$^b$, to and hold them in inoperative or initial position. The notches or gaps 111 in the lever bosses are made long enough to allow the levers 102, 102$^a$, 102$^b$ sufficient free movement to take up the various positions determined by the plungers 1, 1$^a$, 1$^b$.

It will be understood that each of the disks 106 is arrested by the contact of one of its pins 105 with the free end of its associated lever 102, 102$^a$, or 102$^b$, and that such disks, when arrested, bring the required types into position for subsequent printing or marking of the measurement upon the material. In this connection, it is to be understood that the disk 10$^c$ with its cam sections 10 moves with the pointer shaft K of the indicator 73 mounted on the frame of the combined marking and measuring machine, and that the greater the movement of the disk 10$^c$ the greater will be the movement of the disks 106 to bring the higher-numbered type into place to stamp the appropriate characters on the work. In order that the various types, i. e. those of the different elements which correspond, for instance, to the units and tens columns, may be properly aligned, provision is made for adjusting the levers 102, 102$^a$, 102$^b$ on the carrier shaft 103 so that the position of arrest of any disk 106 can be moved forward or backward as may be required. To this end each lever instead of being mounted directly on the shaft 103, is mounted upon an eccentric bushing 113 (Fig. 1) which is free to turn on the shaft. The lever is fastened to the bushing by a set screw (not shown) or other suitable means, and the bushing has a knurled flange (not shown) to enable it to be turned by hand in the lever after slackening the set screw. The said bushings are made shorter than the lever bosses so as to avoid the radial pins 112 but if desired the bushings may be made as long as the bosses and have corresponding notches or gaps formed therein to accommodate said pins. A further lever 102$^c$ (Figure 5) formed without a depending arm but mounted and operated in a manner similar to the other levers 102, 102$^a$, 102$^b$ is provided on the shaft 103 and connected with it is a plunger 1$^c$ fitted with a pawl 114 for engagement with teeth 10$^a$ on the periphery of the stepped disk 10$^c$, when the levers are freed by rotation of the shaft 103 as previously described, to lock said disk in the type selecting position. The aforesaid plungers 1, 1$^a$, 1$^b$, may be slidably supported by a bearing 116 (Fig. 1) mounted on a cross member 117 connecting the end frames 4, and the pawl may be pivotally carried by an arm 118 extending from the said bearing.

The carrier shaft 103 may be operated by a cam or other means. Conveniently, said shaft has an arm 119 (Figs. 1 and 5) fast thereon and connected by means of a link 120 to a bell crank lever 121 which is fulcrumed at 121$^a$ on one of the end frames 4 and fitted with a cam roll 122 for actuation at the required time by a cam 123 (Fig. 5) on the main shaft 15 of the stamping mechanism, the weight of the parts with the assistance of a spring (not shown) serving to keep the roller 122 on the cam 123 on shaft 15. In this way the cam 123 operated in properly timed relation serves to permit the levers 102, 102$^a$ and 102$^b$ to move to position to lock the type disks 106 in selected positions, and subsequently to release the disks by moving the levers back to initial position.

In this marking machine, which is especially adapted for use with a measuring machine, the controlling cam disk 10$^c$ of the combined measuring and marking machine is mounted upon the shaft K which carries and operates the pointer I of the indicator means of the measuring machine. It will be recalled that in this type of indicator means the pointer comes to rest after the last measuring element of the measuring machine loses contact with the work as the rear end of the work passes from the field of measuring operations. The pointer of the indicator means and the pointer shaft remain locked in the indicating position of the pointer until they are released at the will of the operator. The cam disk 10ᶜ which is operated from the pointer shaft is also locked in position to control selection of appropriate type blocks by which the measurement indicated by the pointer may be stamped on the work by the type blocks. Immediately after the cam disk 10ᶜ comes to rest in its type selecting and controlling position the operator throws in the clutch 14 of the marking machine, this operation being immediately followed by a partial rotation of the shaft 103 under control of the cam 123, the shaft moving in the direction of the arrow in Fig. 1.

Rotation of the shaft in the direction indicated permits the weighted levers 109 to operate the plungers 1, 1ᵃ, 1ᵇ and their respectively connected levers 102, 102ᵃ, 102ᵇ, moving the plungers toward their respective cams 10. Obviously the plungers 1, 1ᵃ, and 1ᵇ may move to the right in Fig. 1 such distances as may be determined by the cams 10 carried by the cam disk 10ᶜ. It is to be understood that the amount of rotation of the cam disk 10ᶜ determines the height of each cam at a point opposite to the end of each plunger 1, 1ᵃ, 1ᵇ. In this way the cams 10 control the setting of the plungers and hence of their connected levers, 102, 102ᵃ, 102ᵇ. Immediately following the setting of the plungers and their connected levers, the type disks 106 are caused to rotate in the direction of the arrow in Fig. 1, each disk rotating until one of the pins 105 carried thereby strikes the end of its associated levers 102, 102ᵃ, 102ᵇ, which lever thus acts as a stop for setting the type disk 106 in selected position. Since the type disks 106 are yieldingly driven from the shaft 108 the latter continues to rotate, making a complete revolution, thus insuring that each disk 106 will finally reach selected position. During the rotation of the disks 106 the type elements 7 are moved along therewith and are finally brought into selected position below a type wheel 150, as shown in Figs. 1 and 5 of the drawings. While the type blocks 7 are in selected position, a work support or table hereinafter described is caused to lift the work to press it against the type whereby proper characters are marked on the work.

The carriage 1 is fitted with a table 40 to receive the material to be stamped or marked as it comes from the measuring mechanism Z, and also with a mechanism whereby the material is lifted into contact with types on the type elements 7. This lifting mechanism includes a spring pressed bed or block 42 attached to a plunger 43 and adapted for movement between guides 44 mounted on cross members 45 and through an opening 46 in the bed or table. The cross members 45 are attached to the end frames 2 and serve for the support of intermediate connections through which the plunger 43 is operated at the required time by a cam 47 (Figs. 1 and 3) on the control wheel shaft 15. The plunger may slide through a bracket 48 attached to the cross members 45 and said intermediate connections comprise a bell crank lever 49 fulcrumed on a bracket 50 and pivotally attached to the lower end of the plunger 43, an adjustable link 51 connecting said lever 49 to a similar bell crank lever 52 fulcrumed on a bracket 53, and a connecting link 54 between the lever 52 and a bell crank lever 55 fulcrumed on the pin 28 and fitted with a roll 56 for engagement by the cam 47 on the shaft 15.

Distance pieces furnished by tubes 2ᵈ are provided on upper tie rod 2ᵃ between the opposing frames 2 and 4 of the carriage and the stamping mechanism, and similar distance pieces 2ᵉ are placed on the remaining tie rods 2ᵃ between the frames 2.

As has heretofore been stated, the marking mechanism mounted on the movable carriage 1 may be used selectively with any one of a number of measuring mechanisms by moving it into proper alignment with the measuring mechanism and securing the two together with their driving means in interconnected relation. Furthermore it may be readily detached from its associated measuring mechanism by movement of the carriage 1 to permit the measuring means to be used alone for the single operation of measuring pieces of work. After the marking mechanism has been properly aligned with and operatively connected with a measuring mechanism in the manner already described, a piece of work passed through the combined measuring and marking machine is first measured as to its area and subsequently marked with characters indicating the said measurement. In operating the machine, a piece of work is first presented to the bed roll A (Fig. 1) by which it is fed toward the table 40 of the marking mechanism passing meanwhile under the measuring wheels B which co-operate with the bed roll A in feeding the work. It is to be understood that the measuring wheels B are rotated because of their contact with the work and hence stop their rotative movement as soon as the rear end of the work has passed by. During the rotation of the wheels B the pointer I is being gradually moved over the dial 73 and it finally stops in indicating position after the last measuring wheel B has come to rest. While the pointer I and its shaft K are moving, the disk 10ᶜ with its cams 10 is also moving since the disk 10ᶜ is either secured to the shaft K or directly operated therefrom. Hence the cams 10 are moved to a position which corresponds exactly to the position of the pointer I. It is only after the pointer I and the cams 10 come to rest that the marking mechanism is operated. In the illustrated construction and arrangement, operation of the marking mechanism is initiated by stepping upon the tread of the treadle 13. Hence the marking means is controlled by the operator independently of the measuring elements. Depression of the treadle causes the throwing in of the clutch 14 whereupon the plungers 1, 1ᵃ and 1ᵇ are moved toward the cams 10, the extent of their movement being determined by the height of each cam opposite the end of each plunger. The extent of movement of the plungers 1, 1ᵃ and 1ᵇ determines also the extent of movement of the type elements 7 which are moved through means provided for that purpose to present, opposite to the bed or block 42 in the table 40, type blocks 7 with characters corresponding to the measurement indicated by the pointer on the dial 73. As soon as the selected type elements 7 have reached their proper positions, the block 42 is power operated in the manner described to press the work against the type. Subsequently the block 42 returns to its lowered position and this is followed promptly by operation of the lever 27 which lifts the lever arm 29ᵃ to cause disconnection of the worms F from the worm wheels E, thus permitting the measuring mechanism and also the totalizing and indicating devices all to return to initial or rest position. Since the cam members 10 on the cam disk 10ᶜ are connected to the pointer shaft K, the cams 10 are also returned to initial position and thus both the measuring and marking means are conditioned for operation upon another piece of work.

Having described my invention, what I claim as new and desire to secure by Letters Patent of the United States is:—

1. In a leather measuring and marking apparatus, mechanism for measuring a dimension of a piece of leather and driving means therefor, mechanism for marking on the piece of leather characters recording the measurement, means for properly aligning the measuring and marking mechanisms for relative approaching movement, a train of gears serving as a driving connection between the marking mechanism and the driving means for the measuring mechanism and adapted to intermesh at a point in the relative approaching movement of the marking and measuring mechanisms whereby both mechanisms may be driven from the same source of power, and a stop for limiting the relative approaching movement of the two mechanisms to protect the intermeshing gears.

2. In a leather measuring and marking apparatus, mechanism for measuring a piece of leather, driving means for the said mechanism, mechanism for marking characters on the piece of leather to record the results of the measuring operation, guiding rails for the marking mechanism for properly aligning the marking and measuring mechanisms, pins and members having tapered sockets for securing the mechanisms together in aligned relationship, said driving means comprising a shaft and a gear wheel on the shaft, and driving connections between said gear wheel and the marking mechanism comprising a gear wheel adapted to mesh with the first mentioned gear wheel at a point in the relative approaching movement of the two mechanisms.

3. In a leather measuring and marking apparatus, mechanism for measuring the dimension of a piece of leather, driving means for said mechanism, mechanism for marking characters on the piece of leather to record the results of the measuring operation, means for operating the marking mechanism comprising a shaft and a controlling member loosely mounted on the shaft, connections between the controlling member and the driving means for the measuring mechanism adapted to interconnect with each other at a point in the relative approaching movement of the marking and measuring mechanism, said connections comprising a clutch, and means for operating the clutch to connect the controlling member to its shaft and thus to determine the time of operation of the marking mechanism.

4. In a leather measuring and marking apparatus, mechanism for measuring the dimension of a piece of leather, driving means for said mechanism, mechanism for marking characters on the piece of leather to record the results of the measuring operation, means for operating the marking mechanism comprising a shaft and a controlling wheel loosely mounted on the shaft, connections between the wheel and the driving means for the measuring mechanism adapted to interconnect with each other at a point in the relative approaching movement of the marking and measuring mechanisms, said connections comprising a clutch to connect the controlling wheel to its shaft, and a manually operable member for controlling the clutch to determine the time of operation of the marking mechanism.

5. In a leather measuring and marking apparatus, mechanism for measuring a piece of leather comprising measuring elements for contacting with the leather during measurement thereof, means for returning the measuring elements to initial position following a measuring operation, a marking mechanism for recording on the piece of leather the results of the measuring operation, driving means for the marking mechanism, and means for aligning the measuring and marking mechanisms upon relative approaching movement with respect to each other, said driving means being adapted to engage with the measuring element returning means during the relative approaching movement of the two mechanisms and to operate it in timed relation to the operation of the marking mechanism.

6. In a leather measuring and marking machine, means for measuring the area of a piece of leather comprising measuring elements for contacting with the work, means for marking characters on the piece of leather to record the results of the measuring operation, means under the control of the operator to determine the time of operation of the marking means, means for causing restoration of the measuring elements to their initial rest condition, and means for causing operation of the measuring element restoring means in timed relation to the operation of the marking means.

7. In a leather measuring and marking machine, means for measuring a piece of leather comprising measuring elements for contacting with the work, measurement indicating means, means for marking characters on the piece of leather to record the results of the measuring operation, means for causing restoration of the measuring elements and the indicating means to their initial rest condition, and means controlled by the marking means for causing operation of the restoring means following the operation of the marking means and in timed relation therewith.

8. In a leather measuring and marking machine, means for measuring the area of a piece of leather comprising measuring elements arranged to contact with the work during the measuring operation, marking means operable at the will of the operator for recording on the piece of leather the results of the measuring operation, means under the control of the operator for initiating restoration of the measuring elements to their initial rest condition, and power means for causing restoration of the measuring elements to their initial positions in timed relation to the operation of the marking means.

9. In a leather measuring and marking machine, means for measuring the area of a piece of leather comprising measuring elements arranged to contact with the work during the measuring operation, marking means for recording on the piece of leather the results of the measuring operation, means controlled by the marking means for restoring the measuring elements to their initial rest condition following the operation of the marking means, and means under the control of the operator for initiating operation of the marking and restoring means.

10. In a leather measuring and marking machine, means for measuring the area of a piece of leather comprising measuring elements for contacting with the piece of leather during measurement thereof, means for marking the results of the measuring operation on a piece of leather, power means for operating the marking means, a member operable for initiating restoration of the measuring elements to their initial positions after the measuring operation, and connections between the power means and said member for initiating operation of the marking means independently of the measuring means.

11. In a leather measuring and marking machine, means for measuring the area of a piece of leather comprising elements for contacting with the piece of leather during measurement thereof, marking means and operating means therefor, means operable for initiating restoration of the measuring elements to their initial rest positions, operating connections between the said marking operating means and said return initiating means for operating the latter in timed relation to the operation of the marking means, and means under the control of the operator for initiating operation of the marking means.

12. In a leather measuring and marking machine, means for measuring a piece of leather comprising measuring elements for contacting with the piece of leather during measurement thereof, said measuring means being so constructed and arranged as to tend always to return to initial position, means for marking the results of the measuring operation on a piece of leather, driving mechanism for the marking means, a member for initiating restoration of the measuring elements to their initial rest positions, and connections between the marking means and said member for operating the latter in timed relation to the marking means, said connections comprising an abutment on the member and a cam member in the driving mechanism for the marking means operative to contact with the abutment and to move the same thereby causing operation of the member for initiating restoration of the measuring elements to their initial operative condition.

13. In a leather measuring and marking machine, means for measuring a piece of leather comprising an element movable to indicate measurement of the work, means for marking characters on the piece of leather to record the results of the measuring operation, means for returning the indicating element to initial position, and means controlled by the marking means for causing operation of the indicating element returning means in timed relation to the operation of the marking means.

14. In a leather measuring and marking machine, means for measuring a piece of leather comprising an element movable to indicate the measurement of the leather, marking means and operating means therefor, means for initiating return of the indicating element to initial position subsequently to the measuring operation, and operating connections between the said marking operating means and the return initiating means for operating the latter in timed relation to the operation of the marking means.

15. In a leather measuring and marking machine, means for measuring a piece of leather comprising elements movable during measurement of the leather which elements must be returned to initial position prior to a subsequent measuring operation, means for indicating the measurement comprising a movable element, marking means for recording on the piece of leather the results of the measuring operation, driving mechanism for the marking means, means for returning the measuring and indicating elements to initial position, and means controlled by the marking means and automatically operative for initiating operation of the said returning means in timed relation to the operation of the marking means.

16. In a leather measuring and marking machine, means for measuring a piece of leather comprising an element movable for indicating the measurement, means for marking on the piece of leather characters recording the measurement, and means controlled by the marking means for automatically returning the indicating element to initial position.

17. In a leather measuring and marking machine, means for measuring a piece of leather, means for marking characters on the piece of leather to record the results of the measuring operation, said marking means comprising marking elements, a controlling cam for said elements operated by the measuring means in accordance with the extent of measuring movement of the measuring means, said cam being operative to select and determine the position of marking elements corresponding to the results of the measuring operations, means subsequently operative to cause relative approaching movement of the leather and the selected marking elements to mark the leather, and means controlled by the marking means and automatically operative for returning the controlling cam to its initial position.

18. In a leather measuring and marking machine, means for measuring a piece of leather, means for marking characters on the piece of leather to record the results of a measuring operation, said marking means comprising marking elements, a controlling cam for said elements operated by the measuring means in accordance with the extent of measuring movement for the measuring means, said cam having high and low portions for selecting and determining the positions of marking elements corresponding to the results of the measuring operations, means operative to cause relative approaching movement of the leather and the selected marking elements to mark the leather, and means controlled by the marking means for initiating return of the controlling cam to its initial position of rest.

In testimony whereof I have signed my name to this specification.

GUSTAV ADOLF SCHETTLER.